US005666561A

United States Patent [19]
Stephenson, III

[11] Patent Number: 5,666,561
[45] Date of Patent: *Sep. 9, 1997

[54] ONE-TIME-USE CAMERA WITH HEAT DISABLING MECHANISM

[75] Inventor: Stanley Ward Stephenson, III, Spencerport, N.Y.

[73] Assignee: Eastman Kodak Company, Rochester, N.Y.

[*] Notice: The term of this patent shall not extend beyond the expiration date of Pat. No. 5,563,669.

[21] Appl. No.: 650,872

[22] Filed: May 17, 1996

Related U.S. Application Data

[63] Continuation of Ser. No. 419,335, Apr. 10, 1995, Pat. No. 5,563,669.

[51] Int. Cl.$^6$ ............................ G03B 17/00; G03B 17/36
[52] U.S. Cl. ........................... 396/6; 396/284; 396/301; 396/543
[58] Field of Search ................ 354/149.11, 202, 354/217, 288, 468, 484; 396/6, 176, 301, 281, 284, 543

[56] References Cited

U.S. PATENT DOCUMENTS

| | | | |
|---|---|---|---|
| 5,235,366 | 8/1993 | Kucmerowski | 354/212 |
| 5,410,378 | 4/1995 | Tasaka et al. | 354/149.11 |
| 5,418,585 | 5/1995 | Petruchik et al. | 354/217 |
| 5,452,033 | 9/1995 | Balling et al. | 354/288 |
| 5,502,529 | 3/1996 | Zander | 354/468 |
| 5,517,265 | 5/1996 | Zander et al. | 354/217 |
| 5,530,507 | 6/1996 | Boyd | 354/212 |
| 5,534,962 | 7/1996 | Zander | 354/289.11 |

Primary Examiner—A. A. Mathews
Attorney, Agent, or Firm—Roger A. Fields

[57] ABSTRACT

A one-time-use camera comprises a resistive heating element positioned to apply sufficient heat to a critical component of the camera, such as a plastic taking lens, to permanently damage the component when a battery in the camera is connected to the heating element, and a normally open switch which is closed to connect the battery and the heating element after the last available frame of a filmstrip in the camera has been exposed.

1 Claim, 2 Drawing Sheets

ONE-TIME-USE CAMERA WITH HEAT DISABLING MECHANISM

CROSS-REFERENCE TO RELATED APPLICATION(S)

This is a continuation of application Ser. No. 08/419,335, filed Apr. 10, 1995, now U.S. Pat. No. 3,563,669. Reference is made to commonly assigned copending application Ser. No. 08/403,088, entitled METHOD OF ASSEMBLING ONE-TIME-USE CAMERA and filed Mar. 10, 1995 in the same of James D. Boyd, now U.S. Pat. No. 5,530,507 issued Jun. 25, 1996.

The cross-referenced application is incorporated in this application.

FIELD OF THE INVENTION

The invention relates generally to the field of photography, and in particular to one-time-use cameras. More specifically, the invention relates to a one-time-use camera that can be disabled after the last available frame of a filmstrip is exposed in order to prevent unauthorized reuse of the camera.

BACKGROUND OF THE INVENTION

Film and cameras that are all in one, commonly referred to as single-use or one-time-use cameras, have recently become well known. Typically, the one-time-use camera is a simple point-and-shoot type comprising a plastic, inner, main body part which supports a fixed-focus taking lens, a film metering mechanism with a rotatably supported metering sprocket, a manual film advance thumbwheel, a single-blade shutter, a manual shutter release button, a frame counter for indicating the number of exposures remaining for picture-taking, a direct see-through viewfinder, and possibly an electronic flash unit. Plastic front and rear cover parts often house the main body part between them to complete the camera assembly, and the rear cover part connects to the main body part and/or to the front cover part to make the main body part light-tight. A decorative cardboard outer box contains the camera assembly and has respective openings for the taking lens, the shutter release button, the film advance thumbwheel, the viewfinder, the frame counter, and a flash emission window.

After the photographer takes a picture with the one-time-use camera, he or she manually rotates the thumbwheel to rotate a cassette spool inside the cassette shell to rewind the exposed frame into the cassette shell. The rewinding movement of the filmstrip the equivalent of slightly more than one frame width rotates the metering sprocket, which is in engagement with the filmstrip, to decrement the frame counter to its next lower-numbered setting. When the maximum number of exposures available on the filmstrip are exposed and the filmstrip is completely rewound into the cassette shell, the one-time-use camera is given to a photofinisher who tears the outer box off the camera unit, separates the rear cover part from the main body part, and removes the film cassette with the filmstrip from the main body part. Then, he removes the filmstrip from the cassette shell to develop the negatives and make prints for the customer, and he forwards the used camera parts to the manufacturer for recycling (remanufacture).

Typically, during original manufacture or recycling (remanufacture) of the one-time-use camera, a conventional light-trapping film cassette with a 35 mm filmstrip having a film leader protruding from the cassette shell, and a film take-up spool to which a leading end of the protruding film leader is attached, are placed in respective chambers in the main body part. The protruding film leader is positioned over the metering sprocket to place one of a longitudinal series of edge perforations in the leader onto one of an annular series of peripheral teeth on the metering sprocket in order to engage the leader to the metering sprocket. Then, the rear cover part is fitted to the main body part to prevent the protruding film leader from becoming separated from the metering sprocket, and as disclosed in prior art U.S. Pat. No. 4,972,649, issued Nov. 27, 1990, an exposed end of the film take-up spool is rotated to factory prewind substantially the entire length of the unexposed filmstrip from the cassette shell onto the take-up spool. Lastly, the outer box is placed on the camera assembly.

There is a need recognized in the industry to prevent unauthorized recycling of one-time-use cameras in order to maintain camera quality. Unauthorized recycled cameras may be of lesser quality than originally manufactured or authorized recycled cameras. Thus, prior art U.S. Pat. No. 5,235,366, issued Aug. 10, 1993, discloses a one-time-use camera provided with destroying means for permanently damaging the frame counter after the last available frame of a filmstrip in the camera is exposed in order to prevent the camera from being reused without replacement of the damaged counter.

SUMMARY OF THE INVENTION

A one-time-use camera which comprises destroying means for permanently damaging a critical component of the camera after the last available frame of a filmstrip in the camera has been exposed in order to prevent the camera from being reused without replacement of the damaged component, and a battery, is characterized in that:

the destroying means includes a resistive heating element positioned to apply sufficient heat to the critical component to permanently damage the component when the battery is connected to the heating element, and switch means for connecting the battery and the heating element after the last available frame of a filmstrip in the camera has been exposed.

Preferably, a frame counter is provided in the camera to visibly indicate the last available frame of a filmstrip in the camera has been exposed, and the switch means connects the battery and the heating element after the frame counter visibly indicates the last available frame of the filmstrip has been exposed.

A taking lens for the camera is constructed of a plastic material to be optically distorted when sufficient heat is applied to the taking lens. The heating element is positioned to apply sufficient heat to the taking lens to optically distort the lens.

The switch means is adapted to connect the battery and the heating element at least until the battery is drained to prevent its reuse.

DETAILED DESCRIPTION OF THE INVENTION

The invention is disclosed as being embodied preferably in a one-time-use camera. Because the features of a onetime-use camera are generally, the description which follows is directed in particular only to those elements forming part of or cooperating directly with the disclosed embodiment. It is to be understood, however, that other elements may take various forms known to a person of ordinary skill in the art.

Figure 1:
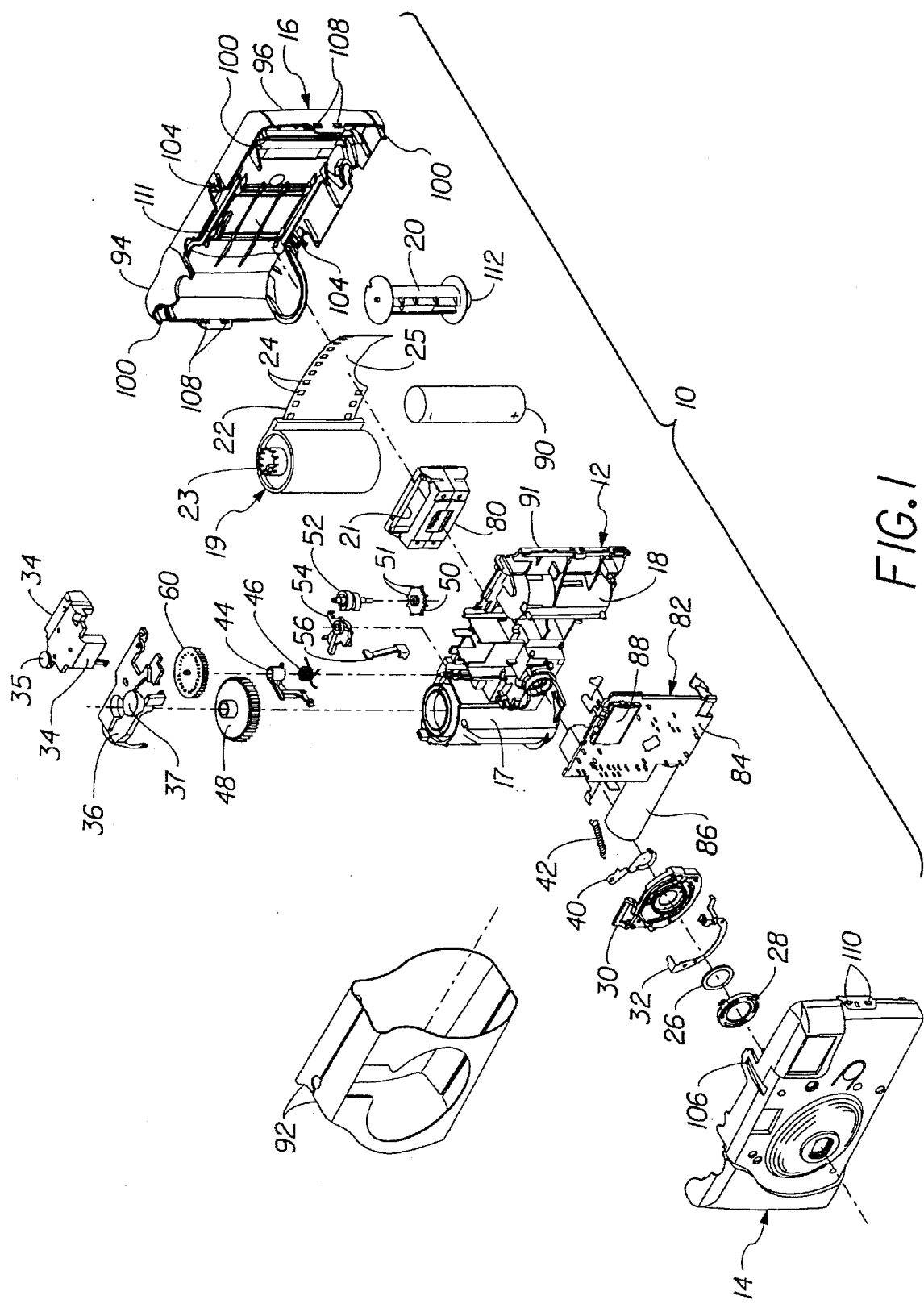
FIG. 1 is an exploded perspective view of a one-time-use camera.

Referring now to the drawings, FIG. 1 depicts a one-time-use or single-use camera 10 having a plastic main body part 12, and a pair of plastic front and rear cover parts 14 and 16 which connect to one another to house the main body part between them in order to complete the camera assembly. The main body part 12 is adapted to be nested in the front cover part 14, and the rear cover part 16 is intended to be fitted to the main body part 12 to make the main body part light-tight.

As shown in. FIG. 1, the main body part 12 has integral cartridge-receiving and film roll chambers 17 and 18 for a light-tight film cartridge 19 and a film take-up spool 20. The chambers 17 and 18 are located at opposite sides of a backframe or film exposure opening 21, at which successive frames of a filmstrip 22 are exposed during picture-taking. The filmstrip 22 is normally stored in a roll form on a cartridge spool 23 rotatably supported inside the film cartridge 19, and has a longitudinal series of edge perforations 24 included along a film leader 25 which protrudes from the film cartridge.

The main body part 12 supports various camera elements which are attached to the main body part before it is nested in the front cover part 14 and the front and rear cover parts 14 and 16 are connected to one another to house the main body part between them. These camera elements are a fixed-focus taking lens 26 which is sandwiched between a snap-on lens retainer 28 and a lens support plate 30, connected to the main body part at its front; a shutter-flash synchronization switch contact 32 attached to the lens support plate 30; a pair of front and rear viewfinder lenses 34 (only the front viewfinder lens is shown in FIG. 1) and an integral frame magnifier 35, connected to the main body part at its top; a shutter mechanism comprising a keeper plate 36 having an integral manually depressable shutter release button 37 for releasing a pivotally mounted shutter blade 40, a shutter return spring 42, a high-energy lever 44 for actuating the shutter blade to pivot the blade open in order to uncover the taking lens to make a film exposure, and a lever actuating spring 46; a film advancing and metering mechanism comprising a manually rotatable film advance thumbwheel 48 for engaging the cartridge spool 23 to rotate the spool in order to wind an exposed frame of the filmstrip 22 into the film cartridge 19 after each film exposure, a film metering sprocket 50 having an annular array of peripheral teeth 51 for successively engaging the respective perforations 24 in the filmstrip, and a cooperating metering cam 52, metering lever 54 and metering spring 56 which operate in a known manner with a rotatable frame counter 60 (made readable via the frame magnifier 37), the film advance thumbwheel 48, and the metering sprocket 50 to decrement the frame counter to its next lower-numbered setting and to lock the thumbwheel (until the shutter release button 37 is depressed) after the thumbwheel is rotated to wind an exposed frame into the film cartridge 19; a light baffle 80 which forms the backframe opening 21; and an electronic flash illumination assembly 82 comprising a circuit board 84, a capacitor 86, a flash emission lens 88, and a flash battery 90. The battery is held in a battery-receiving chamber 91 in the main body part 12. A pair of front and rear decorative labels 92 cover central portions of the front and rear cover parts 14 and 16 after the front and rear cover parts are connected to one another to house the main body part 12 between them.

As shown in FIG. 1, a breakaway cartridge-cover door 94 and a breakaway battery-cover door 96 are provided on the rear cover part 16, opposite the cartridge-receiving chamber 17 and the battery-receiving chamber 91. The two cover doors 94 and 96 can be pivoted open along respective hinge grooves along the inside of the rear cover part 16 to remove the film cartridge 19 and the battery 90 from the chambers 17 and 91.

The rear cover part 16 has three identical corner pins 100 intended to be easily received only slightly in respective corner pin-holes (not shown) in the front cover part 14 when the main body part 12 is nested in the front cover part and the front and rear cover parts are relatively arranged in an intermediate partially-separated assembly position. At the same time an identical pair of top and bottom center hooks 104 on the rear cover part 16 are locally forced into respective top and bottom center slots 106 (only the top one shown in FIG. 1) in the front cover part 14 to prevent the front and rear cover parts from becoming further separated. Since the three corner pins 100 in the rear cover part 16 cannot be inserted further into the three corner pin-holes in the front cover part 14 without some force, and the top and bottom center hooks 104 in the rear cover part are engaged with the front cover part at its two center slots 106, a center portion of the rear cover part will be slightly bowed or flexed inwardly toward the metering sprocket 50 and there is some separation between the rear cover part and the main body part 12.

The cartridge-cover door 94 and the battery-cover door 96 each have an identical pair of end holes 108 adapted to mate with respective pairs of hooks 110 (only one pair shown in FIG. 1) at opposite ends of the front cover part 16 to connect the front and rear cover parts 14 and 16 to one another when the main body part 12 is nested in the front cover part and the front and rear cover parts are relatively arranged in a final non-separated assembly position. At the same time the three corner pins 100 in the rear cover part 16 are machine press-forced further into the three corner pin-holes in the front cover part 14 to discontinue the inward bowing of the center portion of the rear cover part, allowing the rear cover part to inherently straighten. Thus, the rear cover part 16 is fitted to the main body part 12 to make the main body part light-tight.

Assembly Of The One-Time-Use Camera 10

Initially, the film cartridge 19 with the protruding film leader 25 and the film take-up spool 20 to which a leading end of the leader is attached are placed in the cartridge-receiving and film roll chambers 17 and 18 in the main body part 12. One of the film perforations 24 in the protruding film leader 25 is manually placed on one of the peripheral teeth 51 of the metering sprocket 50 to hold the protruding film leader 25 in place. Then, the main body part 12 is nested in the front cover part 14.

Next, the rear cover part 16 and the front cover part 14 are arranged in the intermediate partially-separated assembly position, with the three corner pins 100 of the rear cover part received only slightly in the three corner pin-holes in the front cover part 14, and the top and bottom center hooks 104 of the rear cover part locally forced into the top and bottom center slots 106 in the front cover part 14. At this time there is some separation between the rear cover part 16 and the main body part 12 due to the extension of the three corner pins 100 of the rear cover part from the three corner pin-holes in the front cover part 14, and the center portion of the rear cover part is slightly bowed or flexed inwardly toward the metering sprocket 50 due to the engagement of the top and bottom center hooks 104 in the rear cover part with the front cover part 14 at its top and bottom center slots 106 and the extension of the three corner pins from the three corner pin-holes. The separation allows access to inside the main body part 12 at successive assembly stations, and inward bowing of the center portion further serves to prevent the film leader 25 from becoming disengaged from the metering sprocket 50 during movement of the camera assembly to the assembly stations. The rear cover part 16 has a clearance cavity 111, shown in FIG. 1, for providing a space for the metering sprocket 50.

Next, the rear cover part 16 and the front cover part 14 are arranged in the final assembly position, with the two pairs of hooks 110 at opposite ends of the front cover part locally forced into the two pairs of end holes 108 in the cartridge-cover door 94 and the battery-cover door 96 and the three corner pins 100 on the rear cover part machine press-forced further into the three corner pin-holes in the front cover part, to discontinue the separation between the rear cover part and the main body part 12 and to discontinue inward bowing of the center portion of the rear cover part. Thus, the rear cover part 16 will inherently straighten and be fitted to the main body part 12 to make the main body part light-tight.

Next, a rotational device such as a powered screwdriver is engaged with an exposed end 112 of the film take-up spool 20 to rotate the spool to factory prewind substantially the entire length of the filmstrip 22 from the film cartridge 19 onto the spool.

Lastly, the decorative labels 92 are placed on the front and rear cover parts 14 and 16.

Heat Disabling Mechanisms

Figure 2:
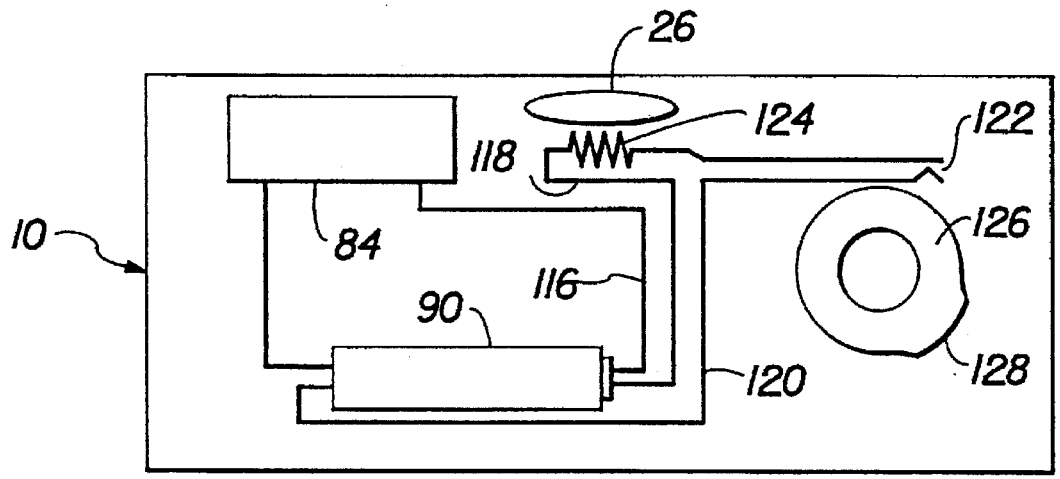
FIG. 2 is a plan view of a heat disabling mechanism of the camera according to a preferred embodiment of the invention.

FIG. 2 shows the battery 90 connected via one pair of electrically conductive leads 114 and 116 to the flash circuit board 84 for flash operation, and connected via another pair of electrically conductive leads 118 and 120 to a normally open switch 122. A resistive heating element 124 in the lead 118 is situated adjacent the taking lens 26. The taking lens 26 is constructed of a plastic material which can be melted or deformed due to the application of sufficient heat. The normally open switch 122 is positioned alongside a cam 126 which is fixed to the underside of the frame counter 60 to rotate a peripheral hub 128 of the cam to close the switch when the frame counter is rotated to provide a visible indication that the last available frame of the filmstrip 22 has been exposed. Closure of the normally open switch 122 allows the battery 90 to furnish electrical energy to the resistive heating element 124 to make the heating element generate sufficient heat to permanently optically distort the taking lens 26. The battery furnishes electrical energy to the heating element 124 until the battery is drained.

Figure 3:
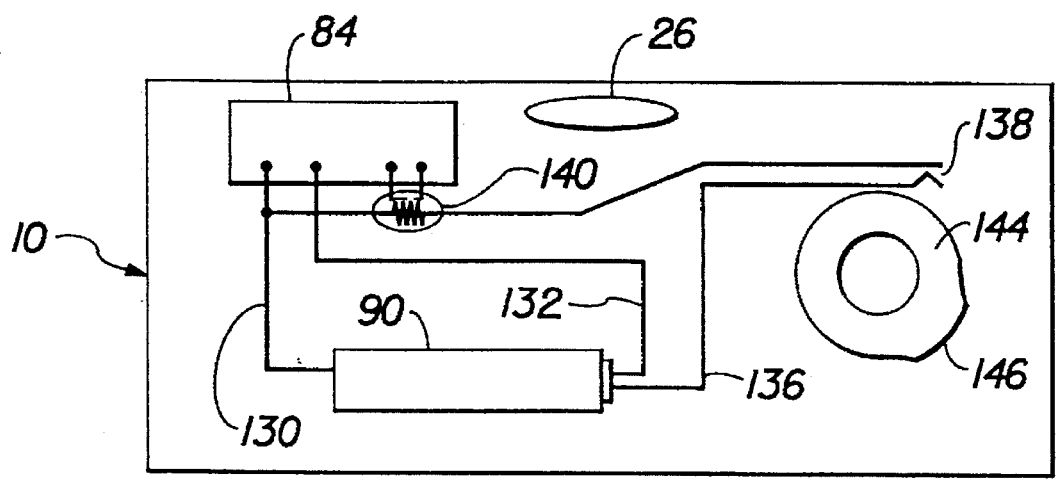
FIG. 3 is a is a plan view of a heat disabling mechanism of the camera according to an alternate embodiment of the invention.

Alternatively, FIG. 3 shows the battery 90 connected via one pair of electrically conductive leads 130 and 132 to the flash circuit board 84 for flash operation, and connected via an extension 134 of the electrically conductive lead 130 and a separate electrically conductive lead 136 to a normally open switch 138. A resistive heating element 140 in the extension 134 is situated adjacent a known heat-activated switch 142 coupled to the flash circuit board 84. The heat-activated switch 142 is adapted to melt to open due to the application of sufficient heat to the switch, to permanently disable the flash circuit board 84. The normally open switch 138 is positioned alongside a cam 144 which is fixed to the underside of the frame counter 60 to rotate a peripheral hub 146 of the cam to close the switch when the frame counter is rotated to provide a visible indication that the last available frame of the filmstrip 22 has been exposed. Closure of the normally open switch 138 allows the battery 90 to furnish electrical energy to the resistive heating element 140 to make the heating element generate sufficient heat to melt the heat-activated switch 142 to open the switch. The battery furnishes electrical energy to the heating element 140 until the battery is drained.

The invention has been described with reference to a preferred embodiment. However, it will be appreciated that variations and modifications can be effected by a person of ordinary skill in the art without departing from the scope of the invention. For example, the resistive heating element 140 could be located adjacent a critical component, such as a heat-sensitive transistor, transformer, or circuit board trace, to permanently damage the critical compnent.

PARTS LIST 10 one-time-use camera
12 main body part
14 front cover part
16 rear cover part
17 cartridge-receiving chamber
18 film roll chamber
19 film cartridge
20 film take-up spool
21 backframe opening
22 filmstrip
23 cartridge spool
24 edge perforations
25 film leader
26 taking lens
28 lens retainer
30 lens support plate
32 shutter-flash synchronization switch contact
34 front and rear viewfinder lenses
35 frame magnifier
36 keeper plate
37 shutter release button
40 shutter blade
42 shutter return spring
44 high-energy lever
46 lever actuating spring
48 film advance thumbwheel
50 film metering sprocket
51 peripheral teeth
52 metering cam
54 metering lever
56 metering spring
60 frame counter
80 light baffle
82 electronic flash illumination assembly
84 circuit board
86 capacitor
88 flash emission lens
90 battery
91 battery-receiving chamber
92 front and rear labels
94 cartridge-cover door
96 battery-cover door
100 three corner guide pins
104 top and bottom center hooks
106 top and bottom center slots
108 two pairs of end holes
110 two pairs of end hooks
111 clearance cavity
112 exposed spool end 114 electrically conducted lead
116 electrically conducted lead
118 electrically conducted lead
120 electrically conducted lead
122 normally open switch
124 resistive heating element
126 cam
128 cam hub
130 electrically conducted lead
132 electrically conducted lead
134 lead extension
136 electrically conducted lead
138 normally open switch
140 resistive heating element
142 heat-activated switch
144 cam
146 cam hub

I claim:

1. A one-time-use camera comprising means for rendering a critical component of the camera ineffective after the last available frame of a filmstrip in the camera has been exposed in order to prevent the camera from being reused without replacement of the critical component, is characterized in that:

said critical component includes a battery;

a frame counter determines that the last available frame has been exposed; and said means drains said battery to prevent its reuse after said frame counter determines that the last available frame has been exposed.

* * * * *